United States Patent
Park

(10) Patent No.: US 8,503,117 B2
(45) Date of Patent: Aug. 6, 2013

(54) APPARATUS FOR DRIVING LENS

(75) Inventor: Cheong-soo Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/039,394

(22) Filed: Mar. 3, 2011

(65) Prior Publication Data

US 2011/0222175 A1  Sep. 15, 2011

(30) Foreign Application Priority Data

Mar. 10, 2010 (KR) .................. 10-2010-0021381

(51) Int. Cl.
*G02B 7/02* (2006.01)
(52) U.S. Cl.
USPC .................. 359/823; 359/824; 359/829
(58) Field of Classification Search
USPC ................................ 359/822–824, 829
See application file for complete search history.

(56) References Cited

U.S. PATENT DOCUMENTS

| 7,729,064 B2 * | 6/2010 | Miyazawa et al. ............. 359/819 |
| 2006/0072220 A1 * | 4/2006 | Hase .............................. 359/823 |
| 2008/0198486 A1 * | 8/2008 | Wakamizu et al. ............ 359/823 |

FOREIGN PATENT DOCUMENTS

JP   05-027149 A   2/1993

* cited by examiner

*Primary Examiner* — Mahidere Sahle
(74) *Attorney, Agent, or Firm* — Drinker Biddle & Reath LLP

(57) ABSTRACT

A lens driving apparatus which lessens shake of the lenses is provided. The lens driving apparatus includes a lens support unit comprising a first support and a second support that face each other, and a slope on an inner surface of the first support, wherein one or more lenses are mounted on the lens support unit; a contact unit disposed between the first and second supports, wherein a protrusion is formed on one surface of the contact unit facing the slope; a force application unit configured to apply a force to the contact unit so that the protrusion contacts the slope; and a driving unit configured to contact another surface of the contact unit and configured to move the lens support unit in an optical axis direction.

10 Claims, 4 Drawing Sheets

APPARATUS FOR DRIVING LENS

CROSS-REFERENCE TO RELATED PATENT APPLICATION

This application claims the benefit of Korean Patent Application No. 10-2010-0021381, filed on Mar. 10, 2010, in the Korean Intellectual Property Office, the entire disclosure of which is incorporated herein by reference.

BACKGROUND

1. Field of the Invention

The invention relates to a lens driving apparatus, and more particularly, to an apparatus for preventing small shake of a lens when a lens support unit moves.

2. Description of the Related Art

Photographing apparatuses often include automatic movement of lenses in order to zoom or focus a subject. The lenses may be moved by, for example, the movement of a small motor. However, often when a lens is moved by an automatically the lens shakes a little. The shakes are undesirable as they may cause a blurry image and they may add wear to parts of the photographing apparatus.

SUMMARY

Therefore, there is a need in the art for a lens driving apparatus which lessens the shake of lenses. The lens driving apparatus including a lens support unit comprising a first support and a second support that face each other, and a slope on an inner surface of the first support, wherein one or more lenses are mounted on the lens support unit; a contact unit disposed between the first and second supports, wherein a protrusion is formed on one surface of the contact unit facing the slope; a force application unit configured to apply a force to the contact unit so that the protrusion contacts the slope; and a driving unit configured to contact another surface of the contact unit and configured to move the lens support unit in an optical axis direction.

The slope may have a spiral shape such that a height of the slope varies in a clockwise or counterclockwise direction.

The force application unit may be an elastic member.

The elastic member may be a coiled compression spring disposed between the contact unit and the second support.

The elastic member may be a coiled tension spring hooked on a hook of the first support and a hook of the contact unit.

The driving unit may include a driving motor; and a lead screw for rotating by the driving motor.

The other surface of the contact unit may include one or more teeth that contact and engage with thread of the lead screw.

The contact unit and the force application unit may be supported by a guide shaft formed between the first and second supports.

The protrusion may be formed on the one surface of the contact unit facing the slope by attaching the protrusion to the one surface of the contact unit facing the slope.

A method of driving a lens is provided. The method of driving the lens including driving a motor causing a contact unit to be driven along an optical axis direction; pressing a protrusion of the contact unit against a surface having a slope of a lens support unit causing the lens support unit to move along the optical axis, wherein the lens support unit includes at least one lens; and pressing the contact unit against the slope of the lens support unit by a force application unit.

BRIEF DESCRIPTION OF THE DRAWINGS

The above and other features and advantages of the invention will become more apparent by describing exemplary embodiments thereof with reference to the attached drawings in which.

DETAILED DESCRIPTION

Figure 1:
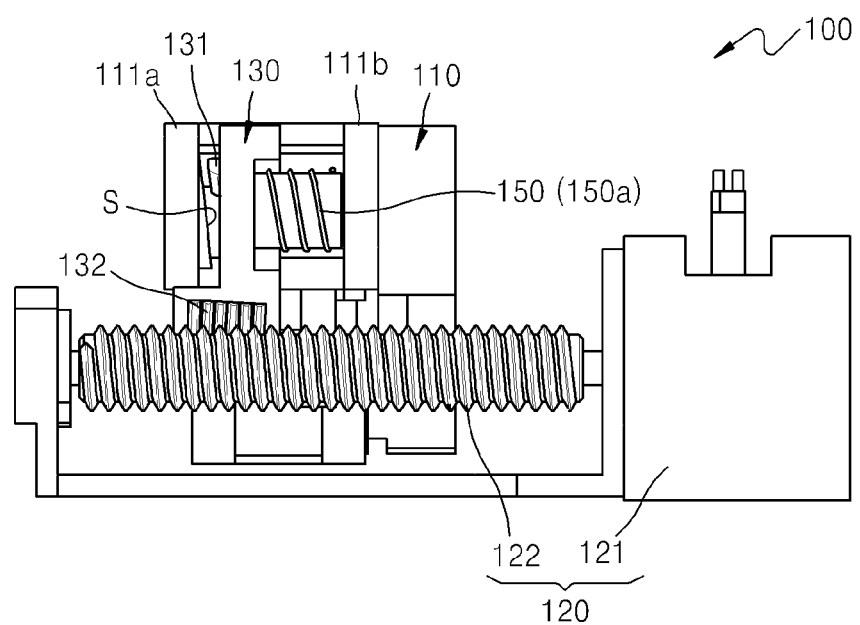
FIG. 1 is a front view of a lens driving apparatus according to an embodiment of the invention.
Figure 2:
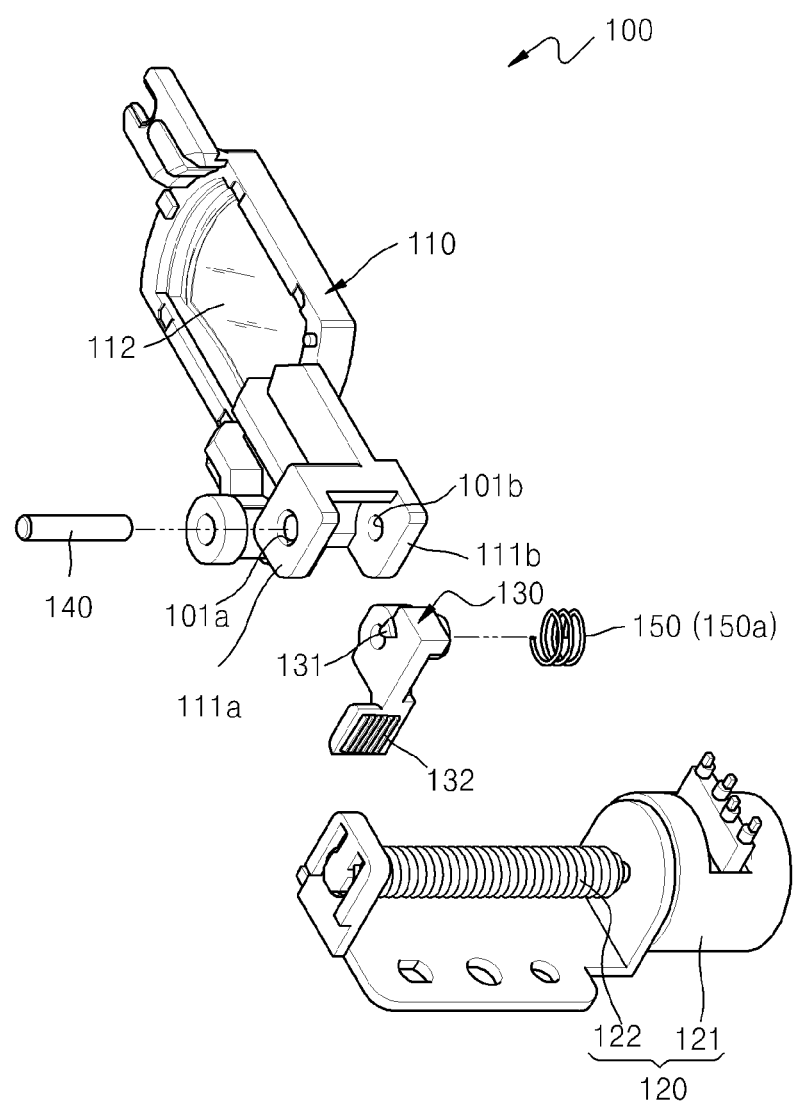
FIG. 2 is an exploded perspective view of the lens driving apparatus illustrated in FIG. 1.
Figure 3:
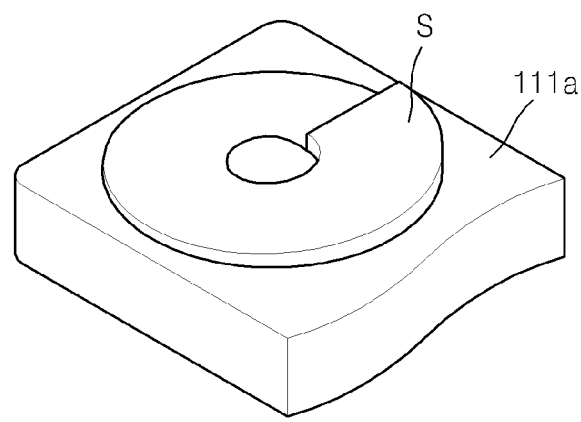
FIG. 3 is a perspective view of a slope formed on a support of the lens driving apparatus illustrated in FIG. 1.

FIG. 1 is a front view of a lens driving apparatus 100 according to an embodiment of the invention. FIG. 2 is an exploded perspective view of the lens driving apparatus 100 illustrated in FIG. 1. FIG. 3 is a perspective view of a slope S on a first support 111a of the lens driving apparatus 100 illustrated in FIG. 1.

Referring to FIGS. 1 through 3, the lens driving apparatus 100 includes a lens support unit 110, a driving unit 120, a contact unit 130, and a force application unit 150.

One or more lenses 112 may be mounted on the lens support unit 110. The lenses 112 may be composed of a fixed lens group and a movable lens group. Light incident along an optical axis is perpendicularly bent by a reflective optical element (not shown), and strikes an imaging device (not shown) such as a charge coupled device (CCD), and is photoelectrically converted into an electrical signal. The lenses 112 mounted on the lens support unit 110 may perform a focusing function.

The lens support unit 110 includes the first support 111a and a second support 111b. The first and second supports 111a and 111b are involved in straight line movement of the lens support unit 110 in the optical axis direction.

The first and second supports 111a and 111b face each other. For example, the first and second supports 111a and 111b may be separate from each other by a predetermined distance and in parallel at opposite ends of the lens support unit 110. A guide shaft 140 is formed between the first and second supports 111a and 111b. For example, through holes 101a and 101b may be respectively formed in the first and second supports 111a and 111b, and the guide shaft 140 may be fitted in the through holes 101a and 101b.

The slope S is formed on a surface of the first support 111a facing the second support 111b. That is, the slope S is formed on an inner surface of the first support 111a or may be attached to the inner surface of the first support 111a. As illustrated in FIG. 3, the slope S may have a spiral shape having a height that varies in a clockwise (or counterclockwise) direction. In the current embodiment, although the height of the slope S varies, an angle θ of the slope S is constant.

The driving unit 120 moves the lens support unit 110 in the optical axis direction, and includes a driving motor 121 and a lead screw 122.

The driving motor 121 may be a general motor or a geared motor. A rotation shaft of the driving motor 121 may rotate in a clockwise (or counterclockwise) direction according to a control signal.

As illustrated in FIG. 1, the lead screw 122 may be mounted on the rotation shaft of the driving motor 121. The lead screw 122 rotates by a driving force of the driving motor 121.

Although the lead screw 122 is mounted on the rotation shaft of the driving motor 121 in FIGS. 1 and 2, the invention is not limited thereto. For example, the driving motor 121 and the lead screw 122 may be connected to each other by an additional force transfer element (not shown). That is, when the driving motor 121 rotates, the driving force of the driving motor 121 may be transferred to the lead screw 122 by the force transfer element, which may be a gear or a belt, and thus the lead screw 122 may rotate.

The rotation of the lead screw 122 may cause straight line motion of the lens support unit 110 in the optical axis direction. For example, when the lead screw 122 rotates, the contact unit 130 contacting the lead screw 122 may move in the optical axis direction and the lens support unit 110 may straightly move in the optical axis direction by the contact unit 130, which acts as a medium.

The lead screw 122 contacts one surface of the contact unit 130. For example, thread may be formed on an outer circumference of the lead screw 122 and may contact one or more teeth 132 formed on the one surface of the contact unit 130.

The contact unit 130 connects the driving unit 120 and the lens support unit 110 to each other, and is formed between the first and second supports 111a and 111b. As illustrated in FIG. 2, the contact unit 130 may be formed between the first and second supports 111a and 111b while the guide shaft 140 passes through the contact unit 130.

The contact unit 130 includes a protrusion 131 formed or attached at a side of the contact unit 130. As illustrated in FIG. 1, the protrusion 131 is formed at a side of the contact unit 130 facing the slope S. As the contact unit 130 moves by a force applied to the contact unit 130, the protrusion 131 contacts the slope S. The force applied to the contact unit 130 and the status of the protrusion 131 according to the applied force will be described below with reference to FIG. 4.

Although the protrusion 131 has an inclined surface in FIG. 1, the invention is not limited thereto. For example, the shape of the protrusion 131 may be a cylindrical shape or a spherical shape.

The one surface of the contact unit 130 contacts the lead screw 122. For example, as illustrated in FIG. 1, the teeth 132 may be formed on the one surface of the contact unit 130 and may contact the lead screw 122. That is, the teeth 132 contact and engage with the thread of the lead screw 122.

Although the one surface of the contact unit 130, on which the teeth 132 are formed, is flat in FIGS. 1 and 2, the invention is not limited thereto. For example, the one surface of the contact unit 130 may have a nut shape or a U shape and the teeth 132 may be formed on an inner surface of the nut shape or the U shape so as to contact the lead screw 122.

The force application unit 150 applies a force to the contact unit 130 in the optical axis direction so that the protrusion 131 of the contact unit 130 contacts the slope S of the first support 111a. The force application unit 150 may be, for example, an elastic member such as a compression spring, a tension spring, or a rubber band.

Although the force application unit 150 is an elastic member in FIGS. 1 and 2, the invention is not limited thereto. That is, any type of member for applying a force to the contact unit 130 so that the protrusion 131 contacts the slope S may be used as the force application unit 150. For example, the repulsive force of a magnet may be used. In FIGS. 1 and 2, a coiled compression spring 150a is used as the elastic member.

The coiled compression spring 150a is located at another side of the contact unit 130 and applies a force to the contact unit 130. The restoring force of the coiled compression spring 150a acts leftward in FIG. 1. Accordingly, the protrusion 131 of the contact unit 130 may constantly contact the slope S.

A connection structure of the slope S of the first support 111a, the contact unit 130 including the protrusion 131, and the force application unit 150 may prevent shake of the lens support unit 110.

A structure for limiting shake of the lens support unit 110 when the lens support unit 110 moves or stands still will now be described in detail.

Figure 4:
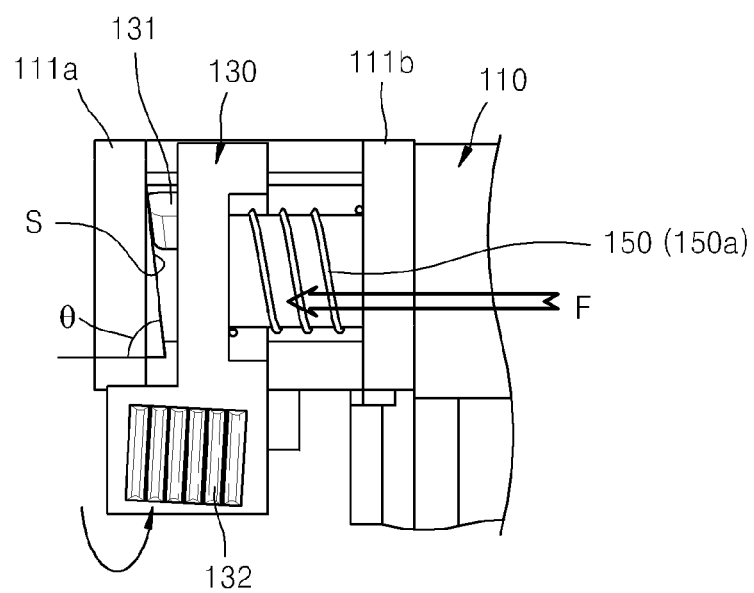
FIG. 4 is a magnified front view of a support, a contact unit, and a force application unit of the lens driving apparatus illustrated in FIG. 1.

FIG. 4 is a magnified front view of the first support 111a, the contact unit 130, and the force application unit 150 of the lens driving apparatus 100 illustrated in FIG. 1. For convenience of explanation, the lead screw 122 is not illustrated.

Referring to FIG. 4, if the force application unit 150 is the coiled compression spring 150a, the force application unit 150 is located at a side of the contact unit 130, where the protrusion 131 is not formed. A space between the contact unit 130 and the second support 111b, where the coiled compression spring 150a is formed, has a length smaller than that of the coiled compression spring 150a, and thus the coiled compression spring 150a is in a compressed state. The restoring force of the coiled compression spring 150a in a compressed state acts as a force F for constantly pushing the contact unit 130.

The protrusion 131 is pushed along the slope S while contacting the slope S, by the constantly pushing force F, i.e., the restoring force. As the protrusion 131 is pushed along the slope S, the contact unit 130 is applied a rotatory force about the guide shaft 140. For example, if the slope S has a decreasing height in a clockwise direction, the contact unit 130 has a rotatory force as illustrated in FIG. 4.

Due to the rotatory force of the contact unit 130, the teeth 132 formed on the contact unit 130 are engage with the thread of the lead screw 122 and thus the contact unit 130 contacts the lead screw 122. As such, small shakes that occur when the lens support unit 110 moves may be lessened. In addition, even when the lens support unit 110 stands still at a certain location, the lens support unit 110 may be more stable against a small external impact.

The angle $\theta$ of the slope S may be designed to be proportional to an elastic coefficient of the coiled compression spring 150a as the force application unit 150. That is, if the angle $\theta$ is small, since the contact unit 130 is applied a rotatory force even when a small force is applied, in this case, the coiled compression spring 150a may have a relatively small elastic coefficient. On the other hand, if the angle $\theta$ is large, since the contact unit 130 has a rotatory force only when a large force is applied, the coiled compression spring 150a needs to have a correspondingly larger elastic coefficient.

Figure 5:
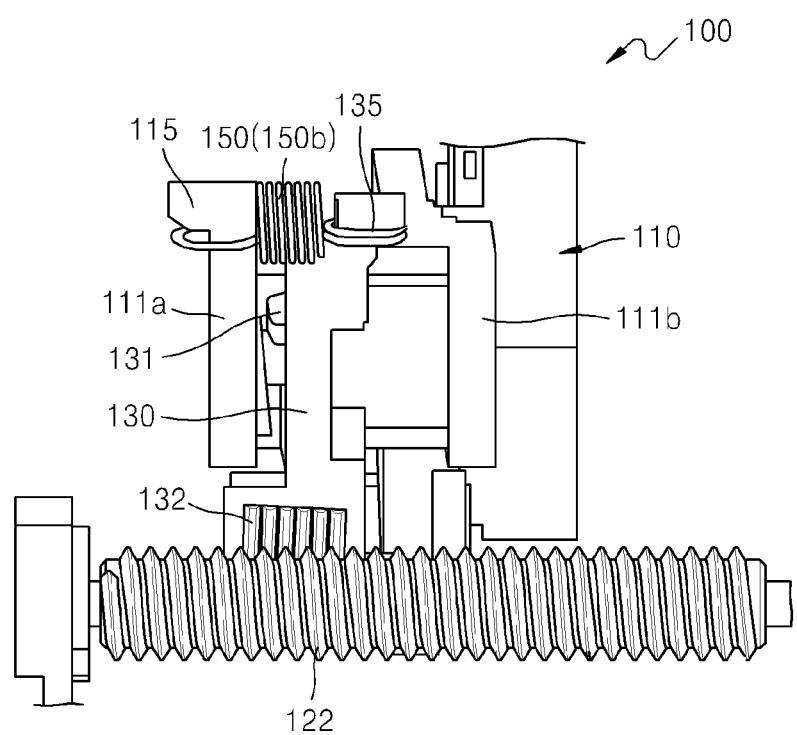
FIG. 5 is a front view of a lens driving apparatus according to another embodiment of the invention.

FIG. 5 is a front view of a lens driving apparatus 100 according to another embodiment of the invention. For convenience of explanation, the driving motor 121 is not illustrated.

Referring to FIG. 5, except that a coiled tension spring 150b is used as the force application unit 150, the other elements are basically the same as those illustrated in FIGS. 1 through 4 and thus only some of the differences from FIGS. 1 through 4 will be described.

As illustrated in FIG. 5, the coiled tension spring 150b may be hooked on hooks 115 and 135 respectively formed at upper portions of the first support 111a and the contact unit 130.

The distance between the hook 115 of the first support 111a and the hook 135 of the contact unit 130 is greater than the length of the coiled tension spring 150b and thus the coiled tension spring 150b is stretched. The restoring force of the coiled tension spring 150b acts as a force for constantly pulling the contact unit 130 leftward in FIG. 5.

The protrusion 131 is pushed along the slope S while contacting the slope S, by the constantly pulling force, i.e., the restoring force. As the protrusion 131 is pushed along the slope S, the contact unit 130 is applied a rotatory force about the guide shaft 140. Due to the rotatory force of the contact unit 130, the contacting force between the teeth 132 formed on the contact unit 130 and thread of the lead screw 122 is increased.

If the coiled compression spring 150a or the coiled tension spring 150b is used in the lens driving apparatus 100, the coiled compression spring 150a or the coiled tension spring 150b may be easily assembled and may not be easily damaged or separated from the lens driving apparatus 100.

Also, a constant force may be applied to the contact unit 130 in a direction in which the protrusion 131 contacts the slope S. Accordingly, the stability of the lens driving apparatus 100 may be increased.

As described above, according to the invention, a contact unit having a rotatory force may stably contact a lead screw and thus shake of a lens support unit may be lessened.

Embodiments of the invention provide a system for preventing shake of and ensuring security of a lens while a lens support unit moves, by using a structure that rotates using a force acting in a straight line.

Reference was made in detail to exemplary embodiments, examples of which are illustrated in the accompanying drawings. However, exemplary embodiments are not limited to the embodiments illustrated hereinafter, and the embodiments herein are rather introduced to provide easy and complete understanding of the scope and spirit of exemplary embodiments. Meanwhile, the terminology used herein is for the purpose of describing particular embodiments only and is not intended to be limiting of exemplary embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section.

While the invention has been particularly shown and described with reference to exemplary embodiments thereof, it will be understood by those of ordinary skill in the art that various changes in form and details may be made therein without departing from the spirit and scope of the invention as defined by the following claims.

What is claimed is:

1. A lens driving apparatus comprising:
   a lens support unit comprising a first support and a second support that face each other, and a slope on an inner surface of the first support, wherein one or more lenses are mounted on the lens support unit;
   a contact unit disposed between the first and second supports, wherein a protrusion is formed on one surface of the contact unit facing the slope;
   a force application unit configured to apply a force to the contact unit so that the protrusion constantly contacts the slope; and
   a driving unit configured to contact another surface of the contact unit and configured to move the lens support unit in an optical axis direction.

2. The lens driving apparatus of claim 1, wherein the slope has a spiral shape such that a height of the slope varies in a clockwise or counterclockwise direction.

3. The lens driving apparatus of claim 1, wherein the force application unit is an elastic member.

4. The lens driving apparatus of claim 3, wherein the elastic member is a coiled compression spring disposed between the contact unit and the second support.

5. The lens driving apparatus of claim 3, wherein the elastic member is a coiled tension spring hooked on a hook of the first support and a hook of the contact unit.

6. The lens driving apparatus of claim 1, wherein the driving unit comprises:
   a driving motor; and
   a lead screw for rotating by the driving motor.

7. The lens driving apparatus of claim 6, wherein the other surface of the contact unit comprises one or more teeth that contact and engage with thread of the lead screw.

8. The lens driving apparatus of claim 1, wherein the contact unit and the force application unit are supported by a guide shaft formed between the first and second supports.

9. The lens driving apparatus of claim 1, wherein the protrusion is formed on the one surface of the contact unit facing the slope by attaching the protrusion to the one surface of the contact unit facing the slope.

10. A method of driving a lens, the method including:
    driving a motor in contact with a contact unit to move the contact unit along an optical axis direction;
    pressing a protrusion of the contact unit constantly against a surface having a slope shape, the surface being part of a lens support unit, causing the lens support unit to move along the optical axis, wherein the lens support unit includes at least one lens; and
    pressing the contact unit against the slope of the lens support unit by a force application unit.

* * * * *